United States Patent [19]
Heck

[11] Patent Number: 4,772,197
[45] Date of Patent: Sep. 20, 1988

[54] EXTRUSION DIE FOR MAKING FLAT PRODUCTS

[75] Inventor: Ernst Heck, Echandens, Switzerland

[73] Assignee: Nestec S. A., Vevey, Switzerland

[21] Appl. No.: 25,509

[22] Filed: Mar. 13, 1987

[30] Foreign Application Priority Data

Apr. 8, 1986 [CH] Switzerland .................. 1364/86

[51] Int. Cl.⁴ .................... B29C 47/12; B29C 47/30
[52] U.S. Cl. ................................. 425/199; 425/204; 425/376 R; 425/382 R
[58] Field of Search ........... 425/461, 464, 190, 198, 425/199, 204, 352, 376 R

[56] References Cited

U.S. PATENT DOCUMENTS

| | | | |
|---|---|---|---|
| 3,191,228 | 6/1965 | Schluter | 425/461 |
| 3,664,779 | 5/1972 | Warre | 425/378 R |
| 3,687,589 | 8/1972 | Schrenk | 425/376 A |
| 4,015,926 | 4/1977 | Nehmey | 425/376 R |
| 4,217,083 | 8/1980 | Machuque | 425/198 |

FOREIGN PATENT DOCUMENTS

| | | | |
|---|---|---|---|
| 0768574 | 11/1971 | Belgium | 425/461 |
| 397357 | 5/1971 | U.S.S.R. | 425/461 |

*Primary Examiner*—Willard Hoag
*Attorney, Agent, or Firm*—Vogt & O'Donnell

[57] ABSTRACT

An extrusion die has at least one distribution bore which communicates with a central bore which receives extruded material from an extruder. Each distribution bore extends perpendicularly with respect to the longitudinal central axis of the central bore and then terminates in a first chamber which has an substantially rectangular cross-section. Each first chamber receives the extruded material from its associated distribution bore and terminates in a counter-pressure distribution plate having a cross-section corresponding with that of the first chamber and having a plurality of bores uniformly distributed therein for forming extruded material from the first chamber into a plurality of strands which are received by a second chamber. Each second chamber has a substantially frustopyramidal profile wherein its cross-section tapers from a cross-section corresponding with that of the first chamber and counter-pressure distribution plate to a smaller substantially rectangular cross-section end for expanding and then for compressing and recombining the material of the strands. The end of each second chamber terminates in an extrusion slot which has a substantially rectangular cross-section corresponding with that of the end of the second chamber. Each extrusion slot terminates in an expansion control slot having a cross-section larger than that of the extrusion slot for expanding the material to its final form.

14 Claims, 2 Drawing Sheets

FIG. I

EXTRUSION DIE FOR MAKING FLAT PRODUCTS

BACKGROUND OF THE INVENTION

This invention relates to an extrusion die for making flat products having an equally smooth surface on either side and regular edges.

The manufacture of products in strip form by the cooking/extrusion/expansion process is known. CH-PS No. 624 604 relates to an extrusion die comprising upstream of the extrusion nozzle a grid arranged in an intermediate position in the front chamber between the tip of the screw of the extruder and the pressure equalization chamber. This die can only be used with an extruder comprising two co-rotating screws. On the other hand, since the screw bears directly against the counter-pressure grid, the wear of the head of the screw of the extruder leads to an irregular product on account of the play which exists between the screw head and the counter-pressure grid. With regard to the product obtained, it is not equally smooth on either side and has a tendency towards arching and towards deformation on account of inner tensions.

SUMMARY OF THE INVENTION

The extrusion die according to the present invention may be used with any screws and screw heads both with a single screw and with a cylindrical or conical co-rotating or contra-rotating twin screw and the wear of the screw heads has no influence on the system because they are separated from the extrusion die itself. The product obtained with the extrusion die according to the present invention is smooth on either side with straight, regular edges, shows no tendency towards arching and is homogeneous throughout.

The present invention relates to an extrusion die for making flat products comprising in the downstream direction:

- a portion defining at least one distribution bore followed by a portion defining a distribution chamber for the dough to be extruded, said bore being positioned after the exit of the central bore of the extruder and extending perpendicularly to the axis of said central bore and said distribution chamber having a substantially rectangular cross-section,
- a counter-pressure and distribution plate drilled with parallel bores and having a substantially rectangular cross-section corresponding to that of said distribution chamber,
- a portion defining a chamber for recombining the strands issuing from the distribution plate having a substantially frustopyramidal profile and a cross-section tapering from said substantially rectangular cross-section to the cross-section of an extrusion slot,
- a portion defining an extrusion slot of substantially rectangular cross-section and
- a portion defining an expansion control slot of wider cross-section than the extrusion slot.

In the context of the invention, a flat product is understood to be a food product of the type obtained by cooking/extrusion/expansion from a dough based on water, flour and fats. Naturally, the dough may also contain other ingredients suitable for use in the food industry, namely sugar, salt, cocoa and the like. The filaments of dough issuing from the counter-pressure plate are called strands.

The advantage of the extrusion die according to the invention lies in the fact that after the starting materials have been brought into contact in the screw(s) of the extrusion system and thoroughly mixed by means of said screws, the dough arrives at the exit of the screws through a central bore in which the entire mass of dough is recombined, after which the mass of dough is distributed through one or more distribution bores and chambers perpendicularly to the axis of said central bore, said distribution chambers being disposed equidistantly from the axis of the central bore and the distribution bores forming between them an angle of 360°/n, n being the number of distribution bores. The angle between the distribution bores is defined as the angle formed by the planes passing through the axis of the central bore and through the various centres of the distribution chambers or counter-pressure plates. In addition, the width of the various distribution bores must be the same.

It can thus be seen that the number, the direction of rotation and the shape of the extrusion screw(s) have no influence on the product to be prepared. The particular arrangement of the distribution chambers provides for uniform distribution of the dough.

The object of the present invention is to provide an extrusion die in which the dough is transported at the same rate in a plane perpendicular to the axis of the central bore. This object is substantially achieved in the distribution chamber which makes it possible to obtain an end product having the characteristics mentioned above, namely a flat product which is smooth on either side, has regular edges and is free from inner tensions. The mode of operation of the extrusion die according to the invention will be explained in more detail hereinafter with reference to the accompanying drawings.

The distribution chamber, the counter-pressure plate and the extrusion slot have a substantially rectangular cross-section of which the small sides terminate in a concave form, for example semi-circular, semi-elliptical, semi-oval, tapered or any other similar form. This rectangular cross-section thus enables the dough to be brought into an elongate form approaching its final form. For the distribution chamber and the counter-pressure plate, the length of the rectangle is between 1 and 10 times its width. For the extrusion slot, the length of the rectangle is between 10 and 50 times its width. It is also possible to use an extrusion slot of wave-form cross-section.

The expansion control slot is preferably made of a material having good sliding properties, for example polytetrafluoroethylene (PTFE) or a composite of PTFE with a material which imparts high rigidity. The other parts of the extrusion die are made of stainless steel or iron. There are no welded parts so that all the components may be rapidly interchanged as required. The extrusion die according to the invention comprises from 2 to 8 distribution bores and, of course, the corresponding number of elements associated therewith, namely the distribution chamber, the counter-pressure plate, the recombining chamber, the extrusion slot and the expansion control slot. The die preferably comprises from 2 to 4 distribution bores. This number depends on the dimensions of the product to be prepared and of the extrusion slot. The main point is always to have a symmetrical distribution in relation to the axis of the central bore. To this end, as already mentioned, the distribution chambers are equidistant from the axis of the central bore and the distribution bores form between them an angle of 360°/n, n being the number of bores. If there are 2, 3 or 4 bores, the angles are, respectively, 180°, 120° and 90°. The counter-pressure plate may comprise from 5 to 40 uniformly distributed bores. Depending on the number of these bores, the end product will have a lighter or heavier texture. The diameter of these bores is generally from 1 to 5 mm. For products that are difficult to form, a calibrating attachment known per se has to be provided at the exit of the expansion control slot for properly forming the four edges of the flat product. This calibrating attachment is not difficult to accommodate, i.e., there is no lack of space, because the extrusion slots are sufficiently far apart from another.

The extruder with its extrusion die is of course integrated in a production line comprising at its exit: a conveyor belt for packing the flat product, a station for toasting the flat product according to the moisture content, the colour, the texture and the appearance of the desired end product and cutters for cutting the flat product to the required size.

Since the speed at which the strips of flat product issue from each extrusion slot is the same, there is no need for the various elements of the production line to be separated instead they may be jointly controlled.

The invention is described in more detail in the following with reference to the accompanying drawings:

DESCRIPTION OF PREFERRED EMBODIMENTS

Figure 1:
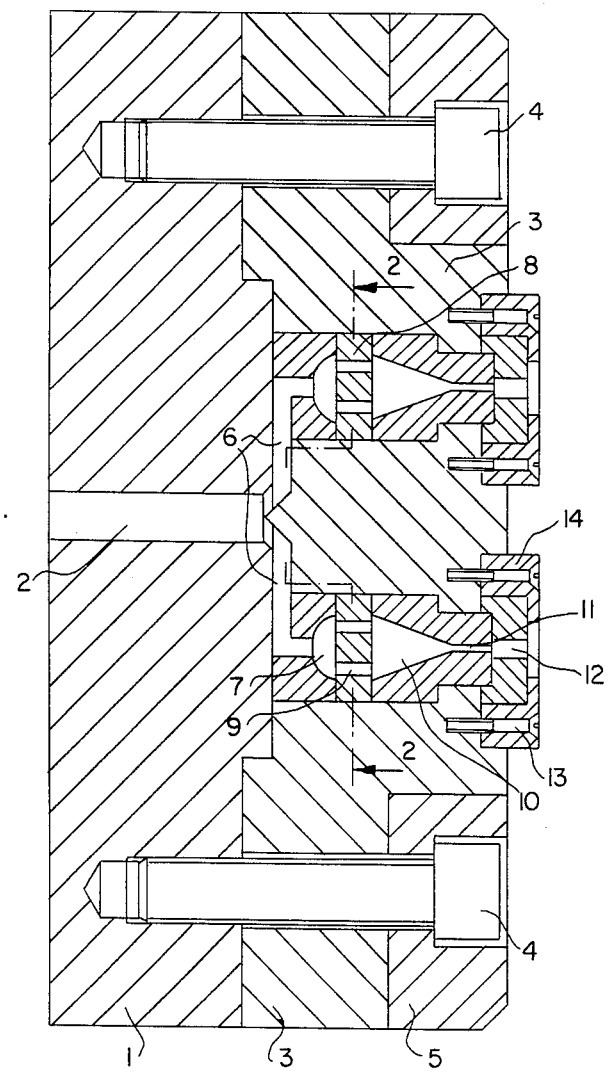
FIG. 1 is a longitudinal section through an extrusion die according to the invention comprising four distribution bores.

The central plate (1) follows the screw(s) of the extruder (not shown) and comprises a central bore (2) which opens into the actual extrusion die (3). This extrusion die (3) is fixed by its screws (4) and a collar (5) to the central plate (1) and comprises distribution bores (6), distribution chambers (7), counter-pressure plates (8) with parallel bores (9), chambers (10) for recombining the strands, extrusion slots (11) and expansion control slots (12). The expansion control slots (12) are fixed to the extrusion die (3) by screws (13) and a collar (14).

The dough arrives through the central bore (2) and is uniformly distributed by the bores (6) to the distribution chambers (7) which, as illustrated, have a longitudinal cross-section axis parallel with the longitudinal cross-section axis of the central bore. It already has substantially the same rate of entry into the counter-pressure plate (8) at all points of a plane perpendicular to the axis of the central bore (2) which makes it possible to form several individual strands of specific configuration taking into account the end product to be prepared.

By virtue of the elongate form of the plate (8) and the size, shape and arrangement of the parallel bores (9), the product is preformed. The pressure and temperature of the dough arriving in this plate may already be considered as uniform. The individual strands of dough are then pre-expanded and homogeneously blended in the recombining chamber (10).

In this zone, the dough acquires a light or dense structure according to the choice of the counter-pressure plate. It is compressed in the direction of the extrusion slot in which the friction on the surface of the product is extremely uniform, leading to an end product of high surface quality.

After the extrusion slot, the product arrives in the expansion control slot where it is post-expanded and assumes its definitive form. The flat product is now ready and continues to advance in the form of a continuous strip along the rest of the production line.

Figure 2:
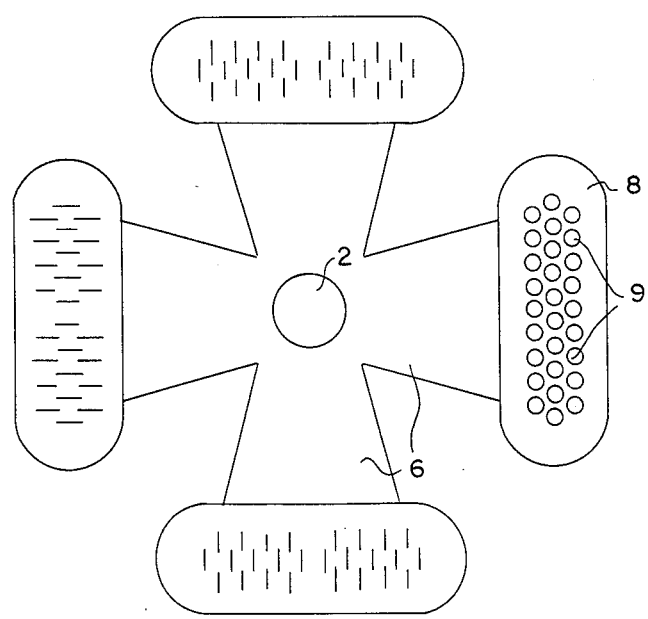
FIG. 2 is a section on the line 2—2 of FIG. 1.

It can clearly be seen from FIG. 2 that the angle between the distribution bores is 90° and that the width of these bores is the same, thus guaranteeing the dough to be extruded a completely symmetrical distribution.

The extrusion die according to the invention is extremely flexible because its various components may be rapidly dismantled and replaced by others, depending on the desired end product.

On the other hand, in the event of any defectiveness in the extrusion die, only the part affected need be removed and replaced. By virtue of the extrusion die according to the invention, it is possible to make a flat product of high quality for the consumer, for example a flat bread. Another interesting advantage of the extrusion die according to the invention is that it provides for rapid adaptation to the desired productivity level. Thus, if an extrusion die comprising four extrusion slots is being used and if it is desired to reduce output by half, the two opposite extrusion slots are closed. When it is desired to return to full capacity, the two extrusion slots are re-opened.

I claim:
1. An extrusion die comprising:
a plate having a central bore having a longitudinal central axis for receiving extruded material from an extruder;
a portion of the die defining at least one distribution bore, wherein each distribution bore communicates with the central bore for receiving the extruded material and then extends perpendicularly with respect to the longitudinal central axis of the central bore;
a portion of the die defining a first chamber, having a substantially rectangular cross-section, terminating each distribution bore for receiving extruded material from the distribution bore;
a counter-pressure distribution plate corresponding in cross-section with and terminating each first chamber and having a plurality of uniformly distributed bores for forming the extruded material from the first chamber into a plurality of strands;
a portion of the die defining a second chamber after each counter-pressure distribution plate having a substantially frustopyramidal profile wherein its cross-section tapers from a cross-section corresponding with the cross-section of the first chamber and counter-pressure distribution plate to a smaller substantially rectangular cross-section end for receiving the plurality of strands of material from the counter-pressure plate for expanding and then for compressing and recombining the material of the strands;
a portion of the die defining an extrusion slot after each second chamber having a substantially rectangular cross-section corresponding with the smaller substantially rectangular cross-section end of the second chamber; and
a portion of the die defining an expansion control slot of larger cross-section than the cross-section of extrusion slot for expanding the material to its final form.
2. An extrusion die according to claim 1 wherein there are at least two of said distribution bores, each being associated with a said first chamber, a said counter-pressure distribution plate, a said second chamber, a said extrusion slot and a said expansion control slot, symmetrically distributed in relation to the longitudinal central axis of the central bore.

3. An extrusion die according to claim 2 wherein there are from 2 to 8 of the distribution bores.

4. An extrusion die according to claim 1 or 2 wherein each first chamber, counter-pressure distribution plate and extrusion slot has small sides which terminate in a concave form.

5. An extrusion die according to claim 4 wherein the concave form is selected from the group consisting of a semi-circular, semi-elliptical, semi-oval and tapered form.

6. An extrusion die according to claim 1 or 2 wherein each first chamber and counter-pressure distribution plate has a length between 1 and 10 times its width.

7. An extrusion die according to claim 1 or 2 wherein each extrusion slot has a length between 10 and 50 times its width.

8. An extrusion die according to claim 6 wherein each extrusion slot has a length between 10 and 50 times its width.

9. An extrusion die according to claim 1 or 2 wherein each counter-pressure distribution plate has from 5 to 40 bores.

10. An extrusion die according to claim 6 wherein the bores of each counter-pressure distribution plate have a diameter of from 1 mm to 5 mm.

11. An extrusion die according to claim 8 wherein the bores of each counter-pressure distribution plate have a diameter of from 1 mm to 5 mm.

12. An extrusion die according to claim 9 wherein the bores of each counter-pressure distribution plate have a diameter of from 1 mm to 5 mm.

13. An extrusion die according to claim 1 or 2 further comprising a calibrating attachment associated with the expansion control slot.

14. An extrusion die according to claim 1 or 2 wherein each first chamber has a longitudinal cross-section axis parallel with the longitudinal cross-section axis of the central bore.

* * * * *